UNITED STATES PATENT OFFICE.

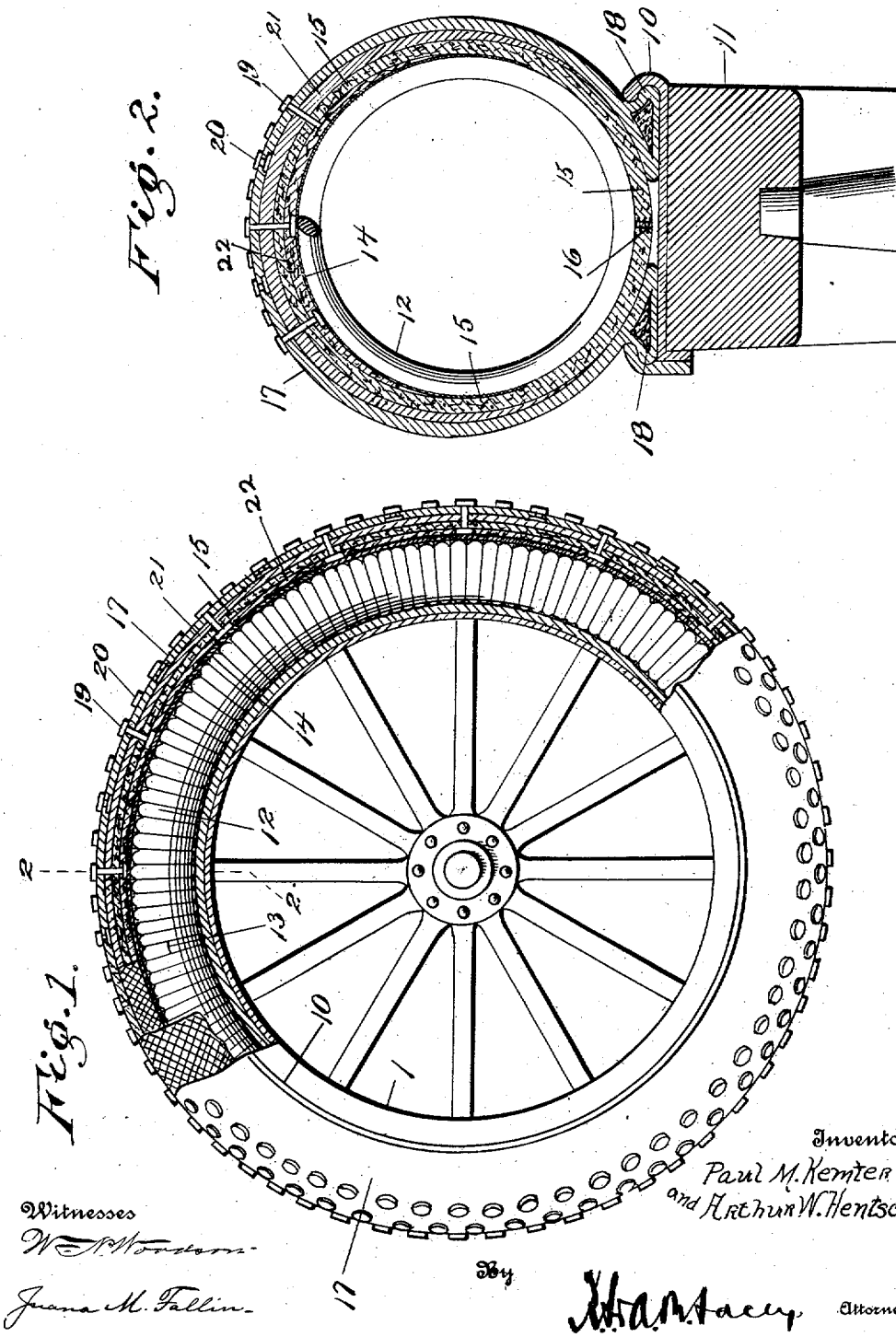

PAUL M. KEMTER AND ARTHUR W. HENTSCHEL, OF WEST NEW YORK, NEW JERSEY.

WHEEL-TIRE.

1,017,764.          Specification of Letters Patent.      Patented Feb. 20, 1912.

Application filed December 14, 1910. Serial No. 597,293.

*To all whom it may concern:*

Be it known that we, PAUL M. KEMTER and ARTHUR W. HENTSCHEL, citizens of the United States, residing at West New York, in the county of Hudson and State of New Jersey, have invented certain new and useful Improvements in Wheel-Tires, of which the following is a specification.

This invention relates to improvements in tires, more particularly to the class of yieldable tires employed upon automobiles and like vehicles, and has for its object to provide a simply constructed wheel tire which will possess the requisite yieldableness to enable it to be employed upon automobiles and like vehicles without employing air under pressure to produce the rotundity of the tire.

With this and other objects in view the invention consists in certain novel features of construction as hereinafter shown and described and then specifically pointed out in the claim; and, in the drawings illustrative of the preferred embodiment of the invention, Figure 1 is a side elevation, partly in section, of one of the improved tires, together with one of the wheel rims to which it is attached; Fig. 2 is an enlarged section on the line 2—2 of Fig. 1.

Corresponding and like parts are referred to in the following description and indicated in all the views of the drawings by the same reference characters.

The improvement may be applied to vehicle wheels of various sizes, and to wheels employed for various purposes, but, as before stated, the invention is more particularly applicable to the wheels of automobiles and like vehicles, but it will be understood that it is not desired to limit the invention to any specific arrangement of wheel or to wheels employed for any specific purpose.

The improved device is readily adapted for application to the ordinary metal rim of an automobile wheel, or to rims having the turned over or clenching edges, and for the purpose of illustration is shown applied to a rim of this character, the turned over rim being represented at 10 and the felly portion of the wheel at 11.

The improved tire includes in its construction an endless tubular body formed from a single coil of wire, and represented as a whole at 12, and curved to conform substantially to the wheel and with its ends firmly united, as by soldering or brazing, as indicated at 13. By this means the body is continuous throughout and will be of sufficient weight or "gage" of wire to resist the strains to which it will be subjected, while at the same time being sufficiently yieldable to insure the requisite yieldableness of the wheel. Bearing upon the outer portions of the circle of coils is a wear member 14, preferably of sheet metal and curved to conform to the outline of the coil and bearing over the outer portion only of the same. Surrounding this body of coils and the wear member 14 is an inner sheathing 15 of fabric, preferably heavy canvas and secured in any suitable manner at the edges, as for instance by lacing, as represented at 16. The sheathing 15 is formed with an inner shorter section 22 directly in contact with the wear plate 14 and reduced at its edges, and bearing upon the inner sheathing 15 is a layer 21 of fabric, preferably canvas and covering the outer portion of the inner sheathing only, or being located where the greatest wear and strains will occur. By this means the tire is materially increased in thickness at the outer portion to increase the resistance where most needed. Bearing around the inner sheathing 15 the outer fabric layer 21 and the reinforcing strip 14 is an outer sheathing 17 of raw hide or similar material, which is impervious to puncture and like injuries. The edges of the outer sheathing are enlarged, as shown at 18, to engage beneath the clenching flanges of the rim 10 in the same manner that an ordinary automobile wheel tire is supported. By this means the outer sheathing may be firmly clamped in position and hold the tire in place, while at the same time presenting an impervious surface to the road over which the wheel operates.

At suitable intervals the three members 15, 21 and 17 are secured together by rivets or other suitable fastening devices, 19, and additional rivets or like fastening devices 20 are supported in the outer sheathing 17, the heads or outer ends of all of the rivets forming protectors, or wear members to engage with the surface of the ground and thus protect the general surface of the outer sheathing. Any required number of the rivets or similar devices may be employed, and they will extend as far as necessary from the center to amply protect the outer sheathing.

Practice has shown that rawhide for the outer sheathing and heavy canvas for the inner sheathing meet the requirements, but it will be understood that any other suitable substance or material may be employed for these purposes. Any suitable metal may be employed for the coil 12, but steel will generally be employed, and may be galvanized or otherwise treated to prevent corrosion.

Having thus described the invention, what is claimed as new is:

A tire of the class described comprising an outer sheathing of rawhide having clencher enlargements, a core formed from a single coil of wire, a sheet metal wear member curved transversely to conform to the curvature of the core and bearing around the outer portion of the same, an intermediate fabric member between the outer member and the core and detachably united at its edges, a fabric enlarging member between the outer portion of the outer member and the intermediate member, a fabric enlarging member between the outer portion of the intermediate member and the metal wear member, and fastening devices extending through the outer sheathing the intermediate member and the enlarging member, said fastening devices bearing at their inner ends upon the wear member.

In testimony whereof we affix our signatures in presence of two witnesses.

PAUL M. KEMTER. [L. S.]
ARTHUR W. HENTSCHEL. [L. S.]

Witnesses:
THOMAS F. MARTIN,
CUTHBERT I. GILLESPIE.